US012626392B2

(12) United States Patent
Liu et al.

(10) Patent No.: US 12,626,392 B2
(45) Date of Patent: May 12, 2026

(54) POSE CALCULATING APPARATUS AND METHOD

(71) Applicant: HTC Corporation, Taoyuan City (TW)

(72) Inventors: Yen-Ting Liu, Taoyuan (TW);
Yu-Heng Hong, Taoyuan (TW);
Jia-Yau Shiau, Taoyuan (TW)

(73) Assignee: HTC Corporation, Taoyuan City (TW)

( * ) Notice: Subject to any disclaimer, the term of this patent is extended or adjusted under 35 U.S.C. 154(b) by 294 days.

(21) Appl. No.: 18/349,947

(22) Filed: Jul. 10, 2023

(65) Prior Publication Data

US 2025/0022156 A1     Jan. 16, 2025

(51) Int. Cl.
| | |
|---|---|
| *G06T 7/70* | (2017.01) |
| *A63B 24/00* | (2006.01) |
| *G01C 21/16* | (2006.01) |
| *G01C 25/00* | (2006.01) |
| *G06V 40/10* | (2022.01) |

(52) U.S. Cl.
CPC ............ *G06T 7/70* (2017.01); *A63B 24/0062* (2013.01); *G01C 21/16* (2013.01); *G01C 25/005* (2013.01); *G06V 40/10* (2022.01); *A63B 2220/05* (2013.01); *A63B 2220/40* (2013.01); *A63B 2220/807* (2013.01); *A63B 2220/836* (2013.01); *A63B 2225/02* (2013.01);
(Continued)

(58) Field of Classification Search
CPC ............ G06T 7/70; G06T 2207/20084; G06T 2207/30201; A63B 24/0062; A63B 2220/05; A63B 2220/40; A63B 2220/807; A63B 2220/836; A63B 2225/02; A63B 2230/62; G01C 21/16; G01C 25/005; G06V 40/10; A61B 5/0077; A61B 5/6823; A61B 5/6824; A61B 5/6829; A61B 5/1079; A61B 5/1116; A61B 5/1128; A61B 5/4561; A61B 5/11; A61B 5/1126; A61B 2562/0219; A61B 2560/0462
See application file for complete search history.

(56) References Cited

U.S. PATENT DOCUMENTS

| | | | | |
|---|---|---|---|---|
| 2016/0012598 A1* | 1/2016 | Sullivan | ................ | A63F 13/211 |
| | | | | 463/33 |
| 2022/0066544 A1* | 3/2022 | Kwon | .................... | G06V 20/41 |

FOREIGN PATENT DOCUMENTS

| | | | | |
|---|---|---|---|---|
| CN | 113611387 A | * 11/2021 | ............. | G16H 20/30 |
| CN | 115105056 A | 9/2022 | | |

(Continued)

OTHER PUBLICATIONS

The corresponding Taiwanese application No. TW112129094 issued on Mar. 8, 2024.

*Primary Examiner* — Stephen G Sherman
(74) *Attorney, Agent, or Firm* — CKC & Partners Co., LLC

(57) ABSTRACT

A pose calculating apparatus and method are provided. The pose calculating apparatus receives a plurality of real-time images and a plurality of inertial measurement parameters corresponding to at least one inertial sensor worn by a user. The pose calculating apparatus determines a pose calculating mode corresponding to each of a plurality of body regions of the user based on the real-time images and the inertial measurement parameters, wherein the pose calculating mode corresponds to a static mode or a motion mode. The pose calculating apparatus calculates a pose corresponding to each of the body regions based on the pose calculating mode corresponding to each of the body regions.

18 Claims, 5 Drawing Sheets

(52) U.S. Cl.
    CPC . *A63B 2230/62* (2013.01); *G06T 2207/20084*
            (2013.01); *G06T 2207/30201* (2013.01)

(56)                 References Cited

FOREIGN PATENT DOCUMENTS

| | | | |
|----|----|----|----|
| JP | 2022-40219 | A | 3/2022 |
| JP | 2023-16825 | A | 2/2023 |
| TW | 201831218 | A * | 9/2018 |

* cited by examiner

POSE CALCULATING APPARATUS AND METHOD

BACKGROUND

Field of Invention

The present invention relates to a pose calculating apparatus and method. More particularly, the present invention relates to a pose calculating apparatus and method capable of correspondingly adjusting the pose calculating mode of each of a plurality of body regions.

Description of Related Art

In recent years, various technologies related to interaction have developed rapidly, and various applications related to interaction have been proposed one after another. In the prior, the pose of the user can be calculated by analyzing the real-time images (e.g., determining the pose by the computer vision) or by the inertial sensor worn (e.g., determining the pose by the inertial measurement parameters) by the user.

However, since the detection frequency of the real-time image is relatively low (e.g., 30 frames per second), it is not suitable for use when the user is exercising. In addition, since computer vision is calculated based on the content of the real-time images, it is easy to cause pose calculation errors due to environmental problems such as the user's body parts being covered, insufficient ambient light, and insufficient contrast.

In addition, although the detection frequency of the inertial sensor is relatively high (e.g., 60 frames per second), the accuracy of pose calculation will decrease with time because the inertial sensor will generate drift values to cause errors, and the drift values will accumulate over time. Furthermore, the process of resetting the inertial sensor is cumbersome, and the user's movement process may cause the position of the inertial sensor to move, thus reducing the accuracy of the inertial sensor.

Accordingly, there is an urgent need for a pose calculating technology that can correspondingly adjust the pose calculating mode of each of a plurality of body regions.

SUMMARY

An objective of the present disclosure is to provide a pose calculating apparatus. The pose calculating apparatus comprises a transceiver interface and a processor. The transceiver interface is communicatively connected to an image capturing device and at least one inertial sensor, and the processor is electrically connected to the transceiver interface. The processor receives a plurality of real-time images and a plurality of inertial measurement parameters corresponding to the at least one inertial sensor worn by a user. The processor determines a pose calculating mode corresponding to each of a plurality of body regions of the user based on the real-time images and the inertial measurement parameters, wherein the pose calculating mode corresponds to a static mode or a motion mode. The processor calculates a pose corresponding to each of the body regions based on the pose calculating mode corresponding to each of the body regions.

Another objective of the present disclosure is to provide a pose calculating method, which is adapted for use in an electronic apparatus. The pose calculating method comprises the following steps: receiving a plurality of real-time images and a plurality of inertial measurement parameters corresponding to at least one inertial sensor worn by a user; determining a pose calculating mode corresponding to each of a plurality of body regions of the user based on the real-time images and the inertial measurement parameters, wherein the pose calculating mode corresponds to a static mode or a motion mode; and calculating a pose corresponding to each of the body regions based on the pose calculating mode corresponding to each of the body regions.

According to the above descriptions, the pose calculating technology (at least including the apparatus and the method) provided by the present disclosure determines the pose calculating mode corresponding to each of the plurality of body regions of the user through the real-time images and the inertial measurement parameters. In addition, the pose calculating technology provided by the present disclosure can select a suitable pose calculating mode to calculate the pose corresponding to each of the body regions through the switching mechanism of the static mode and the motion mode. The pose calculating technology provided by the present disclosure can adjust the pose calculating mode of each of the plurality of body regions correspondingly, thus solving the disadvantages of the conventional technology that may face a decrease in accuracy when determining the pose based on the real-time images and the inertial sensors.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a pose calculating apparatus and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
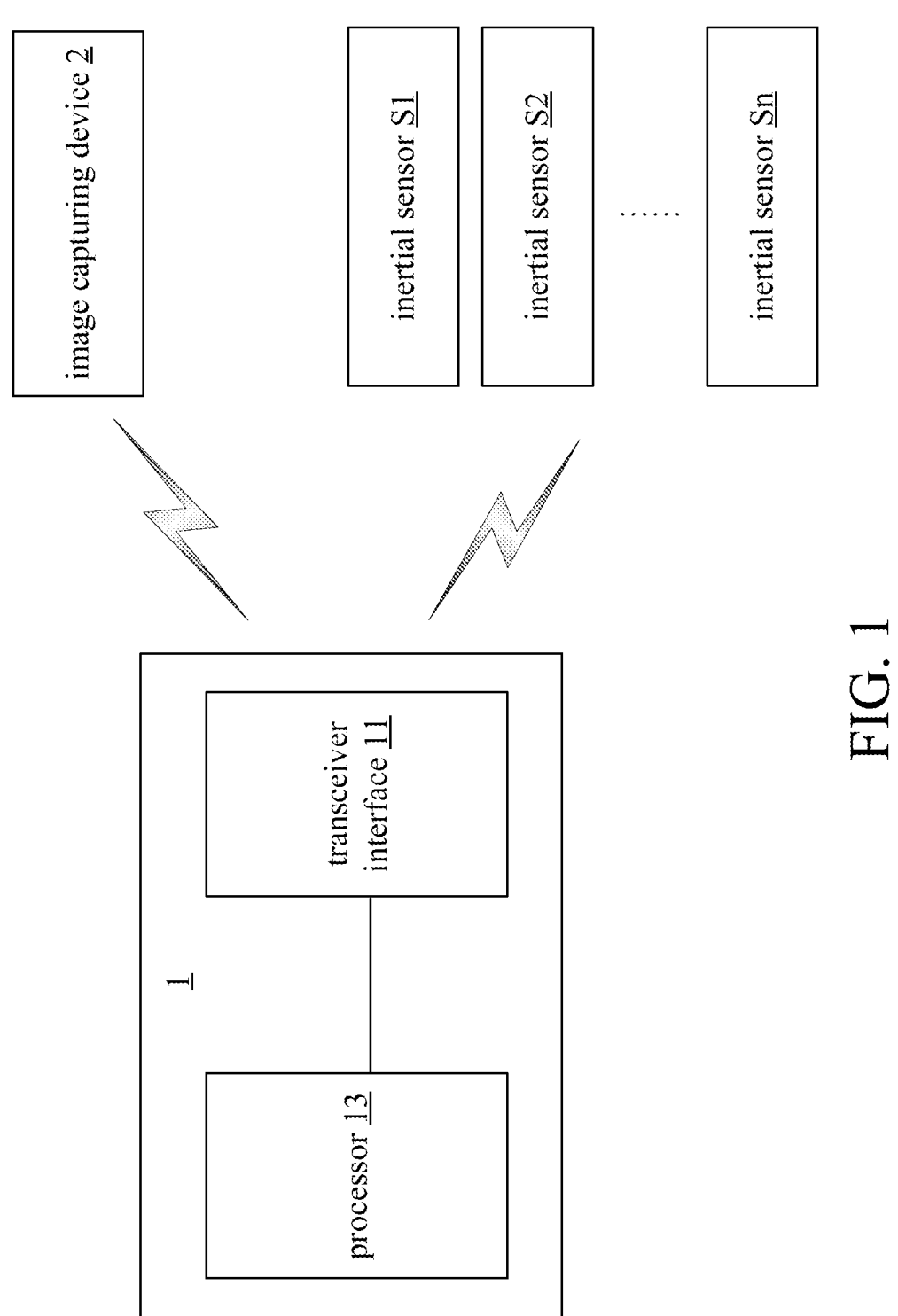
FIG. 1 is a schematic diagram depicting the structure of the pose calculating apparatus of the first embodiment.

The first embodiment of the present disclosure is a pose calculating apparatus 1, and a schematic diagram of which is depicted in FIG. 1. The pose calculating apparatus 1 comprises a transceiver interface 11 and a processor 13, and the processor 13 is electrically connected to the transceiver interface 11. In the present embodiment, the transceiver interface 11 is communicatively connected to the image capturing device 2 and at least one inertial sensor S1, S2, . . . , Sn.

It shall be appreciated that the processor 13 may be any of various processors, Central Processing Units (CPUs), microprocessors, digital signal processors or other computing apparatuses known to those of ordinary skill in the art. The transceiver interface 11 is an interface capable of receiving and transmitting data or other interfaces capable of receiving and transmitting data and known to those of ordinary skill in the art.

In some embodiments, the pose calculating apparatus 1 may be set in an edge device (e.g., a head-mounted device HMD) or a device with computing capability.

Figure 2:
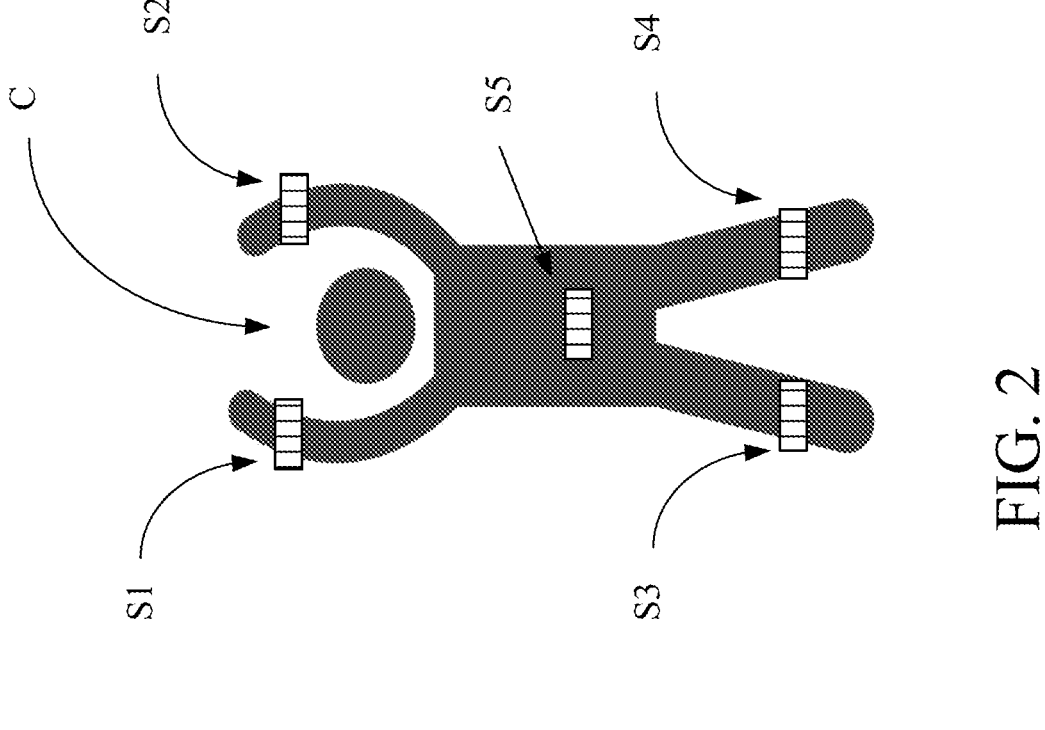
FIG. 2 is a schematic diagram depicting the operating environment of some embodiments.
Figure 2:
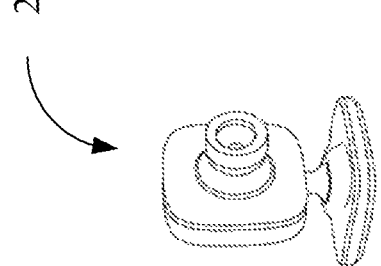

For ease of understanding, FIG. 2 illustrates a schematic diagram of an operating environment of the present disclosure. In the operating environment of the present disclosure, an image capturing device 2 may be installed in a regional space (e.g., the living room), and the user C wears inertial sensors S1, S2, S3, S4, and S5 on the left wrist, right wrist, left ankle, right ankle, and waist, respectively. In the present embodiment, the image capturing device 2 is configured to capture a real-time image corresponding to the user C (e.g., the real-time image including all body parts of the user C), and each of the inertial sensors S1, S2, S3, S4, and S5 is configured to detect inertial measurement parameters corresponding to each of body parts of the user C.

It shall be appreciated that the present disclosure does not limit the number of inertial sensors worn by user C, and those of ordinary skilled in the art should be able to understand the implementations when the user C wears a plurality of inertial sensors based on the descriptions of the present disclosure, so no further description will be made herein.

It shall be appreciated that the image capturing device 2 can be any device with image capturing function. For example, the image capturing device 2 may comprise a plurality of image capturing units (e.g., a plurality of depth camera lenses) for capturing a plurality of real-time images corresponding to a field of view (FOV), and the body part of the user C wearing the inertial sensors are included in the field of view. In addition, the real-time images can be displayed in RGB color mode or grayscale mode.

It shall be appreciated that the inertial sensor may comprises the inertial measurement unit, and the inertial sensors S1, S2, S3, S4, and S5 may continuously generate a series of inertial measurement parameters (e.g., a stream of inertial measurement parameters generated at a frequency of 10 times per second), and each of the inertial measurement parameters may comprises an acceleration, an amount of rotation, and an angular acceleration. During operation, the pose calculating apparatus 1 may periodically receive the inertial measurement parameters from the inertial sensors S1, S2, S3, S4, and S5. In some embodiments, the inertial sensor can also be installed in a wearable device (e.g., a smart wristband).

First, in the present embodiment, the processor 13 receives a plurality of real-time images and a plurality of inertial measurement parameters corresponding to the user C, and each of the inertial measurement parameters corresponds to the at least one inertial sensor worn by the user C (e.g., the inertial sensors S1, S2, S3, S4, and S5 in FIG. 2).

Next, the processor 13 may divide the body of the user C into different regions, and determine the corresponding pose calculating mode for the regions according to the states of different regions (e.g., the degree of exercise, the environmental conditions). Specifically, the processor 13 determines a pose calculating mode corresponding to each of a plurality of body regions of the user C based on the real-time images and the inertial measurement parameters, and the pose calculating mode corresponds to a static mode or a motion mode.

Next, the processor 13 calculates a pose corresponding to each of the body regions based on the pose calculating mode corresponding to each of the body regions.

Figure 3:
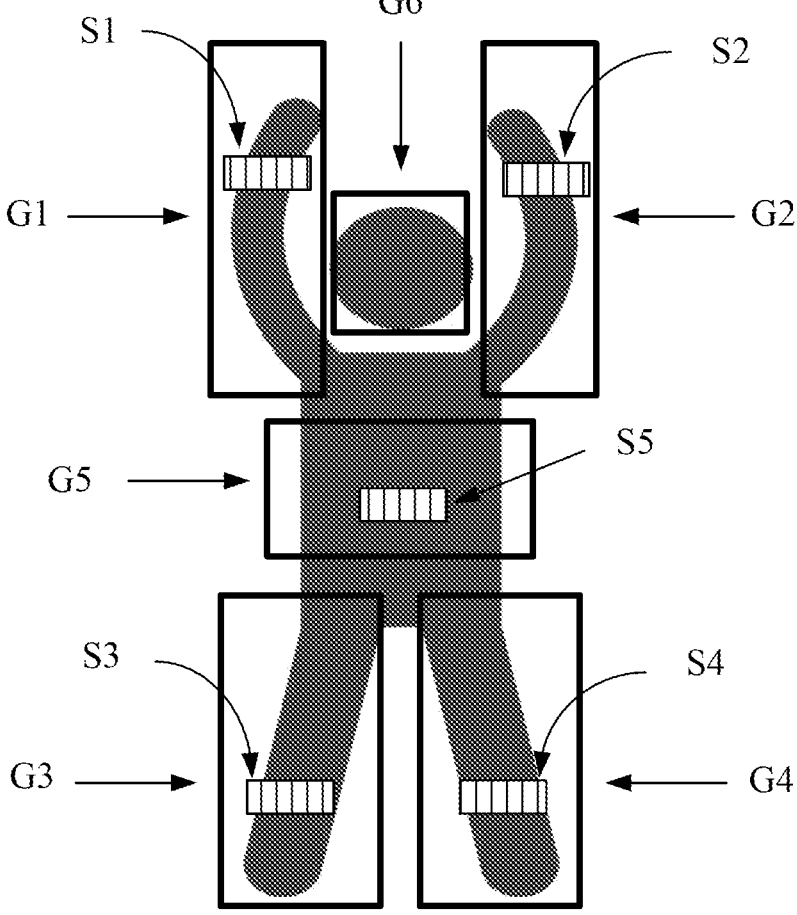
FIG. 3 is a schematic diagram depicting the body regions of some embodiments.

For ease of understanding, please refer to FIG. 3, which illustrates a schematic diagram of body regions corresponding to the user C. In FIG. 3, the processor 13 may divide the body of the user C into different body regions (e.g., groups) G1-G6, the body region G1 corresponds to the range of the right arm of the user C, the body region of the user C G2 corresponds to the range of the left arm of the user C, the body region G3 corresponds to the range of the right leg of the user C, the body region G4 corresponds to the range of the left leg of the user C, the body region G5 corresponds to the range of the waist of the user C, and the body region G6 corresponds to the range of the head of the user C.

It shall be appreciated that, in the present disclosure, each body region may correspond to one or more than one inertial sensor (e.g., the body regions G1-G5 in FIG. 3), or there may be no corresponding inertial sensor (e.g., the body region G6 in FIG. 3). In other words, the present disclosure does not limit the number of inertial sensors corresponding to the body region. When the body region does not have a corresponding inertial sensor, the pose of the body region can be calculated by the real-time images (e.g., when performing interactive football-like activities, the user C only needs to wear inertial sensors on the left leg and the right leg, but does not need to wear inertial sensors on the head).

It shall be appreciated that, in the present disclosure, when the pose calculating mode of the body region is determined to correspond to the static mode, the processor 13 may mainly calculate the pose of the body region based on the real-time images. In some embodiments, when some conditions are met, the processor 13 may further assist in calculating the pose of the body region based on the inertial measurement parameters of the body region.

In addition, when the pose calculating mode of the body region is determined to correspond to the motion mode, the processor 13 may mainly calculate the pose of the body region based on the inertial measurement parameters. In some embodiments, when some conditions are met, the processor 13 may further assist in calculating the pose of the body region based on the real-time images, or calibrate the inertial measurement parameters based on the real-time images.

The following will specifically describe, in some embodiments, the operation when the pose calculating mode of the body region is determined to correspond to the static mode.

Specifically, in response to determining one of the body regions (hereinafter referred to as: the first body region) among the body regions corresponds to the static mode, the processor 13 calculates the pose corresponding to the first body region based on the real-time images.

For example, the processor 13 may analyze the real-time images through a trained image neural network to generate a heat map corresponding to the first body region of the user C. It shall be appreciated that the heat map may indicate the probability (e.g., the confidence value) of motion occurrence at each position. In some embodiments, the processor 13 may select the position with the highest probability of motion occurrence as the pose of the first body region.

In some embodiments, due to environmental problems (e.g., problems with body parts being obscured, poor lighting, etc.), the heat map of the first body region may appear two or more positions with similar probability of motion occurrence (i.e., a plurality of candidate poses), the processor 13 may determine the pose of the first body region from the candidate poses based on the inertial measurement parameters of the first body region. Specifically, the processor 13 calculates at least one candidate pose corresponding to the first body region based on the real-time images. Next, in response to determining that a candidate pose amount of the at least one candidate pose corresponding to the first body region is greater than one, the processor 13 determines the pose corresponding to the first body region based on the inertial measurement parameters.

In some implementations, when the processor 13 determines that a confidence value for the pose calculated based on the real-time images is not met the threshold, the processor 13 may actively switch the pose calculating mode corresponding to the body region to the motion mode. Specifically, the processor 13 calculates a confidence value for the pose corresponding to the first body region. Next, in response to determining that the confidence value corresponding to the pose corresponding to the first body region is lower than a standard value, the processor 13 switches the pose calculating mode of the first body region to the motion mode.

The following will specifically describe, in some embodiments, the operation when the pose calculating mode of the body region is determined to correspond to the motion mode.

Specifically, in response to determining one of the body regions (hereinafter referred to as: the second body region) among the body regions corresponds to the motion mode, the processor 13 calculates the pose corresponding to the second body region based on the inertial measurement parameters.

It shall be appreciated that, in the present disclosure, each of the at least one inertial sensor corresponds to one of the body regions (e.g., as shown in FIG. 3, the inertial sensors S1-S5 correspond to the body region respectively G1-G5).

For example, the processor 13 may analyze the inertial sensing parameters through a trained neural network to generate a pose corresponding to the user C. In some embodiments, the processor 13 may represent the nodes of the body region (e.g., limb parts) through an inverse tree, and the pose can be calculated through an inverse kinematics (IK) algorithm.

In some embodiments, since the inertial measurement parameters may accumulate drift values due to time, the processor 13 may calibrate the inertial measurement parameters based on the visible (i.e., un-occluded) body parts (i.e., joint positions of the user C) captured by the real-time images. Specifically, the processor 13 determines from the body regions whether a body part corresponding to the second body region is a visible state based on the real-time images. Next, in response to determining that the body part corresponding to the second body region is in the visible state, the processor 13 calculates a first drift calibration value corresponding to the body part based on the real-time images corresponding to the body part. Finally, the processor 13 calibrates the inertial measurement parameters generated by a first inertial sensor corresponding to the second body region based on the first drift calibration value.

In some embodiments, the processor 13 may also directly calibrate the inertial measurement parameters based on the inertial sensors (i.e., the inertial sensors worn by the user C)

in the visible state (i.e., un-occluded) captured by the real-time image. Specifically, the processor 13 determines from the body regions whether a first inertial sensor corresponding to the second body region is in a visible state based on the real-time images. Next, in response to determining that the first inertial sensor corresponding to the second body region is in the visible state, the processor 13 calculates a second drift calibration value corresponding to the first inertial sensor based on the real-time images corresponding to the second body region. Finally, the processor 13 calibrates the inertial measurement parameters generated by the first inertial sensor based on the second drift calibration value.

In some implementations, the processor 13 may determine whether to switch the body region to the motion mode by determining the exercise intensity of the body region. Specifically, the processor 13 calculates an exercise intensity value for the first body region based on the inertial measurement parameters. Next, in response to the exercise intensity value exceeding a threshold value corresponding to the first body region, the processor 13 switches the pose calculating mode of the first body region to the motion mode.

It shall be appreciated that the exercise intensity value may comprise one of a range of motion, a speed of motion or a combination thereof. In addition, the processor 13 may set different corresponding thresholds for different body regions. For example, the body region G1 of the right arm has a higher threshold than the body region G5 of the waist. In addition, the processor 13 may also set different weight values for different parts of the same body region, for example, the wrist of the right arm body region G1 has a higher weight value, while the elbow, which also belongs to the right arm body region G1, has a lower weight value. Accordingly, when the processor 13 determines that the value accumulated with the body region exceeds the threshold, the body region is switched to the motion mode together.

In some embodiments, when the contents of the body region cannot be clearly identified (e.g., environmental problems such as occluded body parts, insufficient ambient light sources, insufficient contrast, etc.), the body region can also be actively switched to the motion mode. Specifically, the processor 13 determines whether an occlusion state occurs in the first body region based on the real-time images. Next, in response to the occlusion state occurring in the first body region, the processor 13 switches the pose calculating mode of the first body region to the motion mode.

In some embodiments, the processor 13 may actively calibrate the inertial measurement parameters for the body region of the motion mode after a period of time, so as to avoid accumulation of drift values. Specifically, the processor 13 periodically performs the following operations on the body regions corresponding to the motion mode based on a preset time interval: the processor 13 calculates a third drift calibration value corresponding to each of the body regions based on the real-time images; and the processor 13 calibrates the inertial measurement parameters generated by each of the at least one inertial sensor based on the third drift calibration value.

For example, when the user C is performing a motion of waiting for a swing (e.g., baseball, tennis), serious drift values may occur during the waiting time for swinging. Therefore, it is necessary for the processor 13 to perform active calibration through the real-time images.

Figure 4A:
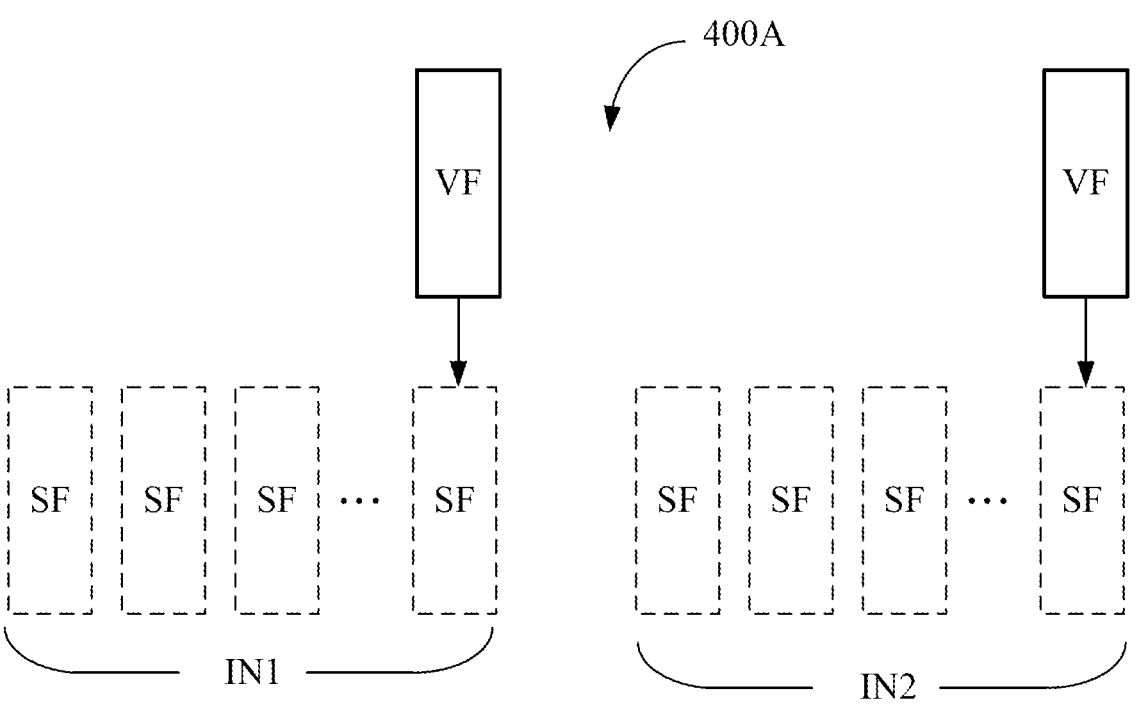
FIG. 4A is a schematic diagram depicting the operation of the static mode of some embodiments.
Figure 4B:
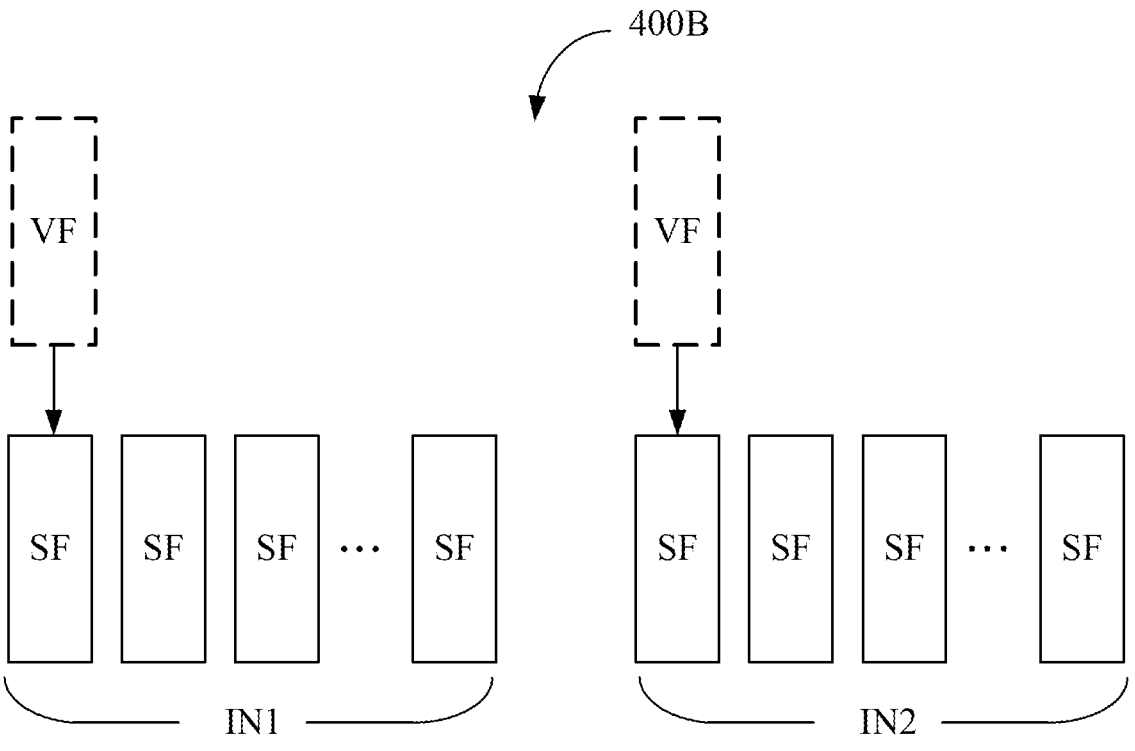
FIG. 4B is a schematic diagram depicting the operation of the motion mode of some embodiments.

For ease of understanding of the operation modes of the static mode and the motion mode, please refer to FIG. 4A and FIG. 4B, which respectively illustrate a schematic diagram 400A of the static mode and a schematic diagram 400B of the motion mode.

In the schematic diagram 400A, the block represented by the solid line is the current main method for calculating the pose (i.e., the real-time images frame VF), and the block represented by the dotted line is the auxiliary frame when certain conditions are met (i.e., the inertial measurement parameters frame SF). In the time interval IN1 or IN2, the detection frequency of the inertial measurement parameters frame SF is higher than that of the real-time images frame VF. When the aforementioned specific conditions are met, the processor 13 may perform an auxiliary determination through the inertial measurement parameters frame SF.

In addition, in the schematic diagram 400B, the block represented by the solid line is the current main method for calculating the pose (i.e., the inertial measurement parameters frame SF), and the block represented by the dotted line is the auxiliary frame when certain conditions are met (i.e., the real-time images frame VF). In the time interval IN1 or IN2, the detection frequency of the inertial measurement parameters frame SF is higher than that of the real-time images frame VF. When the aforementioned specific conditions are met, the processor 13 may perform an auxiliary determination or a calibration through the real-time images frame VF.

In some embodiments, the processor 13 may further combine the poses of each of the body regions to generate a whole-body pose corresponding to the user C.

According to the above descriptions, the pose calculating apparatus 1 provided by the present disclosure determines the pose calculating mode corresponding to each of the plurality of body regions of the user through the real-time images and the inertial measurement parameters. In addition, the pose calculating apparatus 1 provided by the present disclosure can select a suitable pose calculating mode to calculate the pose corresponding to each of the body regions through the switching mechanism of the static mode and the motion mode. The pose calculating apparatus 1 provided by the present disclosure can adjust the pose calculating mode of each of the plurality of body regions correspondingly, thus solving the disadvantages of the conventional technology that may face a decrease in accuracy when determining the pose based on the real-time images and the inertial sensors.

Figure 5:
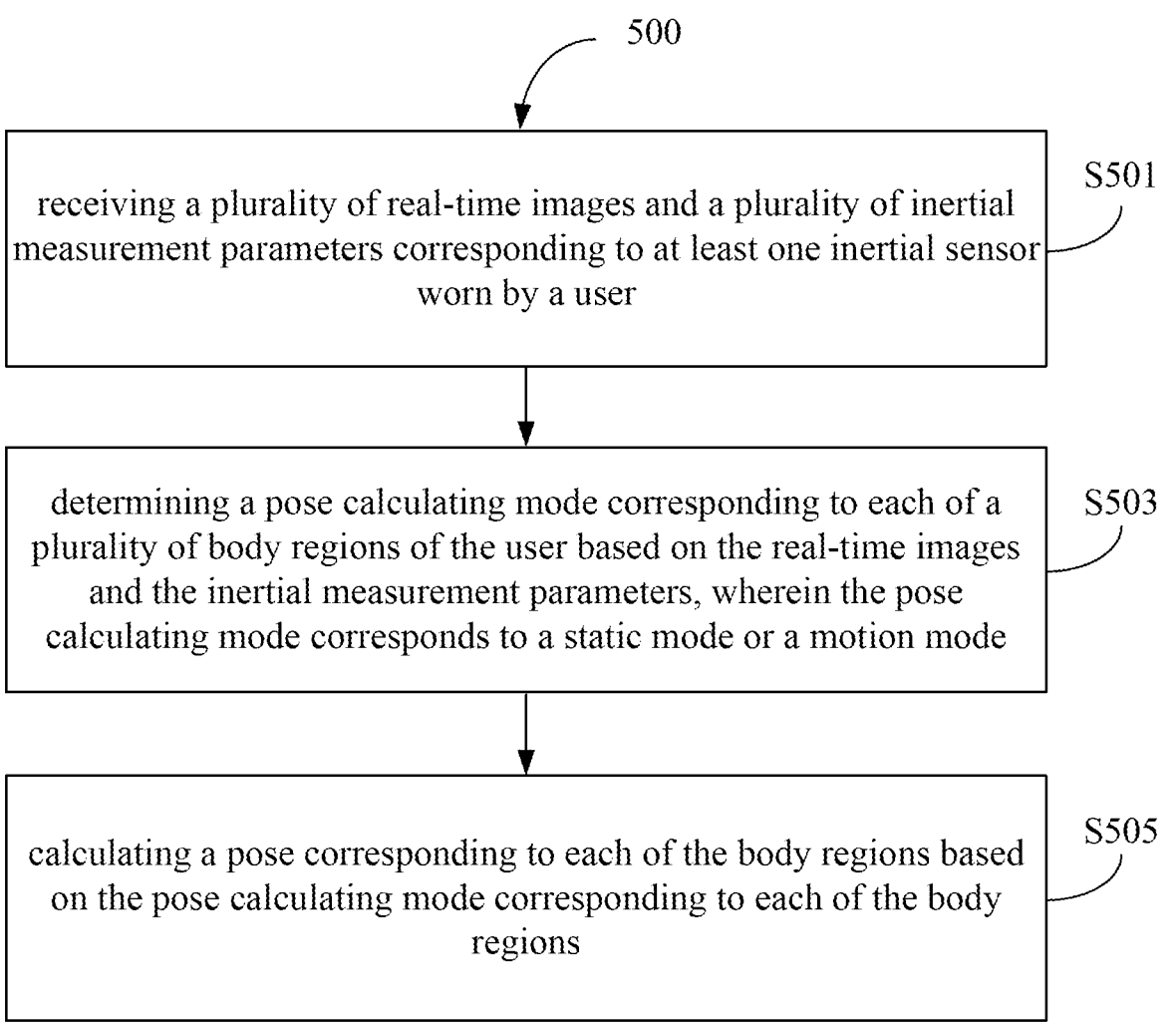
FIG. 5 is a partial flowchart depicting the pose calculating method of the second embodiment.

A second embodiment of the present disclosure is a pose calculating method and a flowchart thereof is depicted in FIG. 5. The pose calculating method 500 is adapted for an electronic apparatus (e.g., the pose calculating apparatus 1 described in the first embodiment). The electronic apparatus is communicatively connected to an image capturing device and at least one inertial sensor (e.g., the image capturing device 2 and the at least one inertial sensor S1, S2, . . . , Sn described in the first embodiment). The pose calculating method 500 calculates the pose corresponding to each of the body regions through the steps S501 to S505.

In the step S501, the electronic apparatus receives a plurality of real-time images and a plurality of inertial measurement parameters corresponding to at least one inertial sensor worn by a user.

Next, in the step S503, the electronic apparatus determines a pose calculating mode corresponding to each of a plurality of body regions of the user based on the real-time images and the inertial measurement parameters, wherein the pose calculating mode corresponds to a static mode or a motion mode.

Finally, in the step S505, the electronic apparatus calculates a pose corresponding to each of the body regions based on the pose calculating mode corresponding to each of the body regions.

In some embodiments, the pose calculating method 500 further comprises the following steps: in response to determining that a first body region among the body regions corresponds to the static mode, calculating the pose corresponding to the first body region based on the real-time images.

In some embodiments, the pose calculating method 500 further comprises the following steps: calculating at least one candidate pose corresponding to the first body region based on the real-time images; and in response to determining that a candidate pose amount of the at least one candidate pose corresponding to the first body region is greater than one, determining the pose corresponding to the first body region based on the inertial measurement parameters.

In some embodiments, the pose calculating method 500 further comprises the following steps: calculating a confidence value for the pose corresponding to the first body region; and in response to determining that the confidence value corresponding to the pose corresponding to the first body region is lower than a standard value, switching the pose calculating mode of the first body region to the motion mode.

In some embodiments, the pose calculating method 500 further comprises the following steps: in response to determining that a second body region among the body regions corresponds to the motion mode, calculating the pose corresponding to the second body region based on the inertial measurement parameters.

In some embodiments, each of the at least one inertial sensor corresponds to one of the body regions, and the pose calculating method 500 further comprises the following steps: determining from the body regions whether a body part corresponding to the second body region is a visible state based on the real-time images; in response to determining that the body part corresponding to the second body region is in the visible state, calculating a first drift calibration value corresponding to the body part based on the real-time images corresponding to the body part; and calibrating the inertial measurement parameters generated by a first inertial sensor corresponding to the second body region based on the first drift calibration value.

In some embodiments, each of the at least one inertial sensor corresponds to one of the body regions, and the pose calculating method 500 further comprises the following steps: determining from the body regions whether a first inertial sensor corresponding to the second body region is in a visible state based on the real-time images; in response to determining that the first inertial sensor corresponding to the second body region is in the visible state, calculating a second drift calibration value corresponding to the first inertial sensor based on the real-time images corresponding to the second body region; and calibrating the inertial measurement parameters generated by the first inertial sensor based on the second drift calibration value.

In some embodiments, the pose calculating method 500 further comprises the following steps: calculating an exercise intensity value for the first body region based on the inertial measurement parameters; and in response to the exercise intensity value exceeding a threshold value corresponding to the first body region, switching the pose calculating mode of the first body region to the motion mode.

In some embodiments, the pose calculating method 500 further comprises the following steps: determining whether an occlusion state occurs in the first body region based on the real-time images; and in response to the occlusion state occurring in the first body region, switching the pose calculating mode of the first body region to the motion mode.

In some embodiments, each of the at least one inertial sensor corresponds to one of the body regions, and the pose calculating method 500 further comprises the following steps: periodically performing the following operations on the body regions corresponding to the motion mode based on a preset time interval: calculating a third drift calibration value corresponding to each of the body regions based on the real-time images; and calibrating the inertial measurement parameters generated by each of the at least one inertial sensor based on the third drift calibration value.

In addition to the aforesaid steps, the second embodiment can also execute all the operations and steps of the pose calculating apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The pose calculating method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the pose calculating apparatus 1), the computer program executes the pose calculating method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the body regions, posture, the drift calibration value, and the inertial sensor) are preceded by terms such as "first", "second", or "third", and these terms of "first", "second", or "third" are only used to distinguish these different words. For example, the "first" and "second" body regions are only used to indicate the body regions used in different operations.

According to the above descriptions, the pose calculating technology (at least including the apparatus and the method) provided by the present disclosure determines the pose calculating mode corresponding to each of the plurality of body regions of the user through the real-time images and the inertial measurement parameters. In addition, the pose calculating technology provided by the present disclosure can select a suitable pose calculating mode to calculate the pose corresponding to each of the body regions through the switching mechanism of the static mode and the motion mode. The pose calculating technology provided by the present disclosure can adjust the pose calculating mode of each of the plurality of body regions correspondingly, thus solving the disadvantages of the conventional technology that may face a decrease in accuracy when determining the pose based on the real-time images and the inertial sensors.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A pose calculating apparatus, comprising:
a transceiver interface, being communicatively connected to an image capturing device and at least one inertial sensor; and
a processor, being electrically connected to the transceiver interface, and being configured to perform the following operations:
receiving a plurality of real-time images and a plurality of inertial measurement parameters corresponding to the at least one inertial sensor worn by a user;
determining a pose calculating mode corresponding to each of a plurality of body regions of the user based on the real-time images and the inertial measurement parameters, wherein the pose calculating mode corresponds to a static mode or a motion mode; and
calculating a pose corresponding to each of the body regions based on the pose calculating mode corresponding to each of the body regions;
wherein each of the at least one inertial sensor corresponds to one of the body regions, and the processor is further configured to perform the following operations:
periodically performing the following operations on one of the body regions corresponding to the motion mode based on a preset time interval:
calculating a third drift calibration value corresponding to each of the body regions corresponding to the motion mode based on the real-time images, wherein each of the body regions corresponding to the motion mode comprises one of the at least one inertial sensor; and
calibrating the inertial measurement parameters generated by each of the at least one inertial sensor based on the third drift calibration value.

2. The pose calculating apparatus of claim 1, wherein the processor is further configured to perform the following operations:
in response to determining that a first body region among the body regions corresponds to the static mode, calculating the pose corresponding to the first body region based on the real-time images.

3. The pose calculating apparatus of claim 2, wherein the processor is further configured to perform the following operations:
calculating at least one candidate pose corresponding to the first body region based on the real-time images; and
in response to determining that a candidate pose amount of the at least one candidate pose corresponding to the first body region is greater than one, determining the pose corresponding to the first body region based on the inertial measurement parameters.

4. The pose calculating apparatus of claim 3, wherein the processor is further configured to perform the following operations:

calculating a confidence value for the pose corresponding to the first body region; and in response to determining that the confidence value corresponding to the pose corresponding to the first body region is lower than a standard value, switching the pose calculating mode of the first body region to the motion mode.

5. The pose calculating apparatus of claim 2, wherein the processor is further configured to perform the following operations:

calculating an exercise intensity value for the first body region based on the inertial measurement parameters; and in response to the exercise intensity value exceeding a threshold value corresponding to the first body region, switching the pose calculating mode of the first body region to the motion mode.

6. The pose calculating apparatus of claim 2, wherein the processor is further configured to perform the following operations:

determining whether an occlusion state occurs in the first body region based on the real-time images; and in response to the occlusion state occurring in the first body region, switching the pose calculating mode of the first body region to the motion mode.

7. The pose calculating apparatus of claim 1, wherein the processor is further configured to perform the following operations:

in response to determining that a second body region among the body regions corresponds to the motion mode, calculating the pose corresponding to the second body region based on the inertial measurement parameters.

8. The pose calculating apparatus of claim 7, wherein each of the at least one inertial sensor corresponds to one of the body regions, and the processor is further configured to perform the following operations:

determining from the body regions whether a body part corresponding to the second body region is a visible state based on the real-time images;

in response to determining that the body part corresponding to the second body region is in the visible state, calculating a first drift calibration value corresponding to the body part based on the real-time images corresponding to the body part; and calibrating the inertial measurement parameters generated by a first inertial sensor corresponding to the second body region based on the first drift calibration value.

9. The pose calculating apparatus of claim 7, wherein each of the at least one inertial sensor corresponds to one of the body regions, and the processor is further configured to perform the following operations:

determining from the body regions whether a first inertial sensor corresponding to the second body region is in a visible state based on the real-time images;

in response to determining that the first inertial sensor corresponding to the second body region is in the visible state, calculating a second drift calibration value corresponding to the first inertial sensor based on the real-time images corresponding to the second body region; and calibrating the inertial measurement parameters generated by the first inertial sensor based on the second drift calibration value.

10. A pose calculating method, being adapted for use in an electronic apparatus, wherein the pose calculating method comprises:

receiving a plurality of real-time images and a plurality of inertial measurement parameters corresponding to at least one inertial sensor worn by a user;

determining a pose calculating mode corresponding to each of a plurality of body regions of the user based on the real-time images and the inertial measurement parameters, wherein the pose calculating mode corresponds to a static mode or a motion mode; and calculating a pose corresponding to each of the body regions based on the pose calculating mode corresponding to each of the body regions;

wherein each of the at least one inertial sensor corresponds to one of the body regions, and the pose calculating method further comprises the following steps:

periodically performing the following operations on one of the body regions corresponding to the motion mode based on a preset time interval:

calculating a third drift calibration value corresponding to each of the body regions corresponding to the motion mode based on the real-time images, wherein each of the body regions corresponding to the motion mode comprises one of the at least one inertial sensor; and calibrating the inertial measurement parameters generated by each of the at least one inertial sensor based on the third drift calibration value.

11. The pose calculating method of claim 10, wherein the pose calculating method further comprises the following steps:

in response to determining that a first body region among the body regions corresponds to the static mode, calculating the pose corresponding to the first body region based on the real-time images.

12. The pose calculating method of claim 11, wherein the pose calculating method further comprises the following steps:

calculating at least one candidate pose corresponding to the first body region based on the real-time images; and in response to determining that a candidate pose amount of the at least one candidate pose corresponding to the first body region is greater than one, determining the pose corresponding to the first body region based on the inertial measurement parameters.

13. The pose calculating method of claim 12, wherein the pose calculating method further comprises the following steps:

calculating a confidence value for the pose corresponding to the first body region; and in response to determining that the confidence value corresponding to the pose corresponding to the first body region is lower than a standard value, switching the pose calculating mode of the first body region to the motion mode.

14. The pose calculating method of claim 11, wherein the pose calculating method further comprises the following steps:

calculating an exercise intensity value for the first body region based on the inertial measurement parameters; and in response to the exercise intensity value exceeding a threshold value corresponding to the first body region, switching the pose calculating mode of the first body region to the motion mode.

15. The pose calculating method of claim 11, wherein the pose calculating method further comprises the following steps:

determining whether an occlusion state occurs in the first body region based on the real-time images; and in response to the occlusion state occurring in the first body region, switching the pose calculating mode of the first body region to the motion mode.

16. The pose calculating method of claim 10, wherein the pose calculating method further comprises the following steps:

in response to determining that a second body region among the body regions corresponds to the motion mode, calculating the pose corresponding to the second body region based on the inertial measurement parameters.

17. The pose calculating method of claim 16, wherein each of the at least one inertial sensor corresponds to one of the body regions, and the pose calculating method further comprises the following steps:

determining from the body regions whether a body part corresponding to the second body region is a visible state based on the real-time images;

in response to determining that the body part corresponding to the second body region is in the visible state, calculating a first drift calibration value corresponding to the body part based on the real-time images corresponding to the body part; and calibrating the inertial measurement parameters generated by a first inertial sensor corresponding to the second body region based on the first drift calibration value.

18. The pose calculating method of claim 16, wherein each of the at least one inertial sensor corresponds to one of the body regions, and the pose calculating method further comprises the following steps:

determining from the body regions whether a first inertial sensor corresponding to the second body region is in a visible state based on the real-time images;

in response to determining that the first inertial sensor corresponding to the second body region is in the visible state, calculating a second drift calibration value corresponding to the first inertial sensor based on the real-time images corresponding to the second body region; and calibrating the inertial measurement parameters generated by the first inertial sensor based on the second drift calibration value.

* * * * *